(12) United States Patent
Lomerson, Sr. et al.

(10) Patent No.: US 7,199,483 B2
(45) Date of Patent: Apr. 3, 2007

(54) TIDAL POWER GENERATION

(76) Inventors: Robert B. Lomerson, Sr., 9952 Boat Club Rd., Fort Worth, TX (US) 76179-4004; Robert B. Lomerson, Jr., 3420 Spring Valley Dr., Bedford, TX (US) 75021

( * ) Notice: Subject to any disclaimer, the term of this patent is extended or adjusted under 35 U.S.C. 154(b) by 0 days.

(21) Appl. No.: 11/448,503

(22) Filed: Jun. 7, 2006

(65) Prior Publication Data

US 2006/0255593 A1   Nov. 16, 2006

Related U.S. Application Data

(62) Division of application No. 11/064,579, filed on Feb. 24, 2005, now Pat. No. 7,075,190.

(51) Int. Cl.
  *F03B 13/00*   (2006.01)
(52) U.S. Cl. ...................................... 290/53
(58) Field of Classification Search ............... None
  See application file for complete search history.

(56) References Cited

U.S. PATENT DOCUMENTS

| | | | |
|---|---|---|---|
| 163,451 A | 5/1875 | Buckner |
| 559,969 A | 5/1896 | Delmonte |
| 596,124 A | 12/1897 | Pyle |
| 637,734 A | 12/1899 | Johnson |
| 884,080 A | 4/1908 | Fallis |
| 896,572 A | 8/1908 | Pepper |
| 974,282 A | 11/1910 | Brum |
| 987,685 A | 3/1911 | Atkinson |
| 1,004,332 A | 9/1911 | Allen |
| 1,035,049 A | 8/1912 | Read |
| 1,048,389 A | 12/1912 | Braunsdorf |
| 1,061,061 A | 5/1913 | Frame |
| 1,066,396 A | 7/1913 | Frame |
| 1,083,794 A | 1/1914 | Braunsdorf |
| 1,089,120 A | 3/1914 | Erickson |
| 1,105,249 A | 7/1914 | Bustos |
| 1,177,053 A | 3/1916 | Priestley |
| 1,276,112 A | 8/1918 | Reed |

(Continued)

FOREIGN PATENT DOCUMENTS

GB    2039330 A   *   8/1980

(Continued)

*Primary Examiner*—Joseph Waks
(74) *Attorney, Agent, or Firm*—Geoffrey A. Mantooth

(57) ABSTRACT

A tidal power generator has a floating vessel hull that is subject to rising and falling water levels so that the hull moves vertically up and down. Linear-to-rotary converters are coupled between the vessel hull and a fixed object. The converters allow the hull to move vertically while constraining the horizontal movement of the hull. The converters convert the vertical movement of the hull into rotary movement, which is then used to drive an electrical generator. A harborage is provided to protect the hull and the converters and to regulate the water level for the vessel hull as well as become a fixed object relative to the vessel from which a change in relative position causes power to be developed. If the hull is subject to tidal variations, vertical movement of the hull can be desynchronized from the tidal variations so as to store energy during slack tides.

8 Claims, 14 Drawing Sheets

U.S. PATENT DOCUMENTS

| | | | |
|---|---|---|---|
| 1,376,140 A | 4/1921 | Ervin | |
| 1,403,702 A | 1/1922 | Melvin | |
| 1,471,222 A | 10/1923 | Taylor | |
| 1,482,713 A | 2/1924 | Stein | |
| 1,693,125 A | 11/1928 | Van Epps | |
| 1,799,848 A | 4/1931 | Hansen | |
| 1,816,044 A | 7/1931 | Gallagher | |
| 1,818,066 A | 8/1931 | Jouy | |
| 1,864,499 A | 6/1932 | Grigsby | |
| 2,749,085 A | 6/1956 | Searcy | |
| 2,855,851 A | 10/1958 | Shumen | |
| 3,664,125 A | 5/1972 | Strange | |
| 3,928,771 A * | 12/1975 | Straumsnes | 290/43 |
| 3,959,663 A | 5/1976 | Rusby | |
| 4,034,565 A * | 7/1977 | McVeigh | 60/503 |
| 4,184,336 A | 1/1980 | Lamberti | |
| 4,208,878 A | 6/1980 | Rainey | |
| 4,241,283 A * | 12/1980 | Storer, Sr. | 290/54 |
| 4,305,003 A | 12/1981 | Basurto | |
| 4,434,375 A | 2/1984 | Taylor | |
| 4,443,707 A * | 4/1984 | Scieri et al. | 290/4 R |
| 4,455,824 A | 6/1984 | Dabringhaus | |
| 4,475,334 A * | 10/1984 | Kuwabara | 60/398 |
| 4,476,396 A * | 10/1984 | Calvert, Jr. | 290/53 |
| 4,540,313 A * | 9/1985 | Broome | 405/78 |
| 4,594,853 A | 6/1986 | Raichlen | |
| 4,627,240 A | 12/1986 | Holmes | |
| 4,674,279 A * | 6/1987 | Ali et al. | 60/398 |
| 4,698,969 A | 10/1987 | Raichlen | |
| 5,929,531 A | 7/1999 | Lagno | |
| 6,000,880 A * | 12/1999 | Halus | 405/52 |
| 6,275,570 B1 * | 8/2001 | Homan et al. | 379/88.17 |
| 6,800,954 B1 | 10/2004 | Meano | |
| 6,863,806 B2 | 3/2005 | Stark et al. | |
| 7,078,827 B2 | 7/2006 | Brewington | |
| 7,084,521 B1 * | 8/2006 | Martin | 290/54 |

FOREIGN PATENT DOCUMENTS

| | | | |
|---|---|---|---|
| GB | 2394514 A * | 4/2004 | |
| GB | 2407345 A * | 4/2005 | |
| JP | 62228672 A * | 10/1987 | |
| JP | 10274145 A * | 10/1998 | |
| WO | WO 200292919 A1 * | 11/2002 | |

* cited by examiner

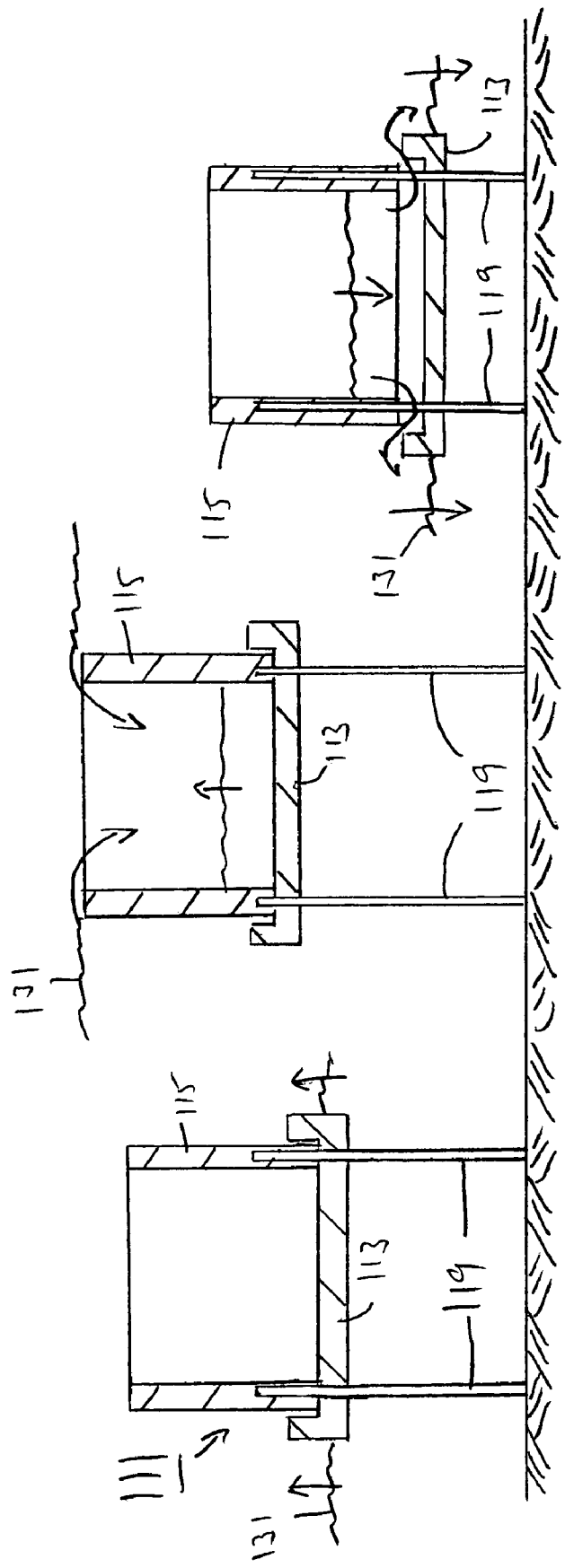

TIDAL POWER GENERATION

This application is a divisional patent application of application Ser. No. 11/064,579, filed Feb. 24, 2005 now U.S. Pat. No. 7,075,190.

FIELD OF THE INVENTION

The present invention relates to extracting energy from tides on water bodies.

BACKGROUND OF THE INVENTION

Most of the electricity generated in the United States requires hydrocarbon-based fuel sources such as coal, oil or natural gas. The burning of such fuels produces harmful emissions that are both difficult and expensive to either contain, or remove, from the exhaust gasses. Also, the transport of these fuels from point of origin, to point of processing (such as refining crude oil), to point of use not only requires the expenditure of additional energy, but is inefficient, costly, potentially hazardous and creates further harmful emissions. In addition, most sources of liquid hydrocarbon-based fuels used in the United States are located outside of the United States. The political environments of many producing areas, such as the Middle East, Venezuela, Russia and Nigeria have been unstable in recent history.

Nuclear power plants pose an alternative generating source to hydrocarbon fuels. However, nuclear power plants are expensive to build and pose security problems. Also, the disposal and storage of spent nuclear fuel is an expensive and a highly contentious problem. Public perception of nuclear power plants is largely negative.

Solar panels are still another alternative. At present, solar panels are high in cost, very low in efficiency and are unusable at night and on cloudy or stormy days. Wind power, while available, is also dependent on the weather as well as being inefficient and relatively expensive.

In contrast to solar and wind, the tides are highly regular, cycling once or twice each twenty-four hour period. Although the height of tides vary due to factors such as coastline geography, the lunar cycle, and to a lesser degree, the direction and velocity of the wind, tides are remarkably constant and continuously changing. In some areas of the world, the water level range may be as much as forty-four feet between high and low tide.

In the prior art, tides have been harnessed by opening and closing flood gates to impound a head of water. The impounded water drives turbines. Such schemes have been planned, if not actually used, in Passamaquoddy Bay between Maine and New Brunswick, Canada. The continuous opening and closing of the flood gates creates problems. Also, the efficiency is somewhat low because only part of the tidal rise and fall can be used. Marine life is adversely impacted as well.

SUMMARY OF THE INVENTION

The present invention provides a method of generating power. A harborage is provided with an interior and an exterior, with the exterior being subject to tidal variations. A vessel hull is floated in the interior of the harborage. Water is allowed to flow between the interior and the exterior of the harborage so as to vary the water level in the harborage interior and to move the vessel hull vertically. The vertical movement of the vessel hull is desynchronized from the tidal variations. Power is generated from the vertical movement of the vessel hull.

In accordance with one aspect of the present invention the vertical movement of the vessel hull is desynchronized from tidal variations by retarding the vertical movement of the vessel hull so as to vary the displacement of the vessel hull within the harborage.

In accordance with still another aspect of the present invention, the vertical movement of the vessel hull is desynchronized from the tidal variations by regulating the flow of water between the interior and the exterior of the harborage so as to lag the tidal variations.

In accordance with still another aspect of the present invention, the step of floating a vessel hull in the interior of the harborage further comprises floating a vessel hull with a displacement. The vessel hull displacement is varied so that the vessel hull has a first displacement on a rising water level and a second displacement on a falling water level, with the second displacement being greater than the first displacement.

In accordance with one aspect of the present invention, the step of varying the displacement of the vessel hull further comprises taking on water and discharging water from the vessel hull.

In accordance with still another aspect of the present invention, the step of taking on and discharging water from the vessel hull further comprises providing a port in the vessel hull that allows water to flow out of the vessel hull. A buoyant cover is provided for the port. The cover is allowed to move between open and closed positions relative to the port, wherein on a rising water level, the cover is in the closed position and on a falling water level, the cover moves to the open position.

In accordance with still another aspect of the present invention, the step of generating power from the vertical movement of the vessel hull further comprises producing pressurized fluid from the vertical movement of the vessel hull. The pressurized fluid is used to rotate a turbine.

In accordance with still another aspect of the present invention, the step of allowing water to flow between the interior and the exterior of the harborage so as to vary the water level in the harborage interior and move the vessel hull vertically further comprises the step of generating power from the flow of water between the interior and the exterior of the harborage.

The present invention also provides a power generator that comprises a body of water that has a top level that fluctuates. A vessel hull is buoyantly located on the water body, the hull being free to move vertically as the top level fluctuates. A piston-cylinder arrangement is coupled between the vessel hull and the fixed object. The cylinder has an output for pressurized fluid when the vessel moves vertically. The piston-cylinder arrangement constrains horizontal movement of the vessel hull. A turbine has an input which is connected to the cylinder output. The pressurized fluid from the cylinder rotates the turbine.

In accordance with one aspect of the present invention, the body of water is contained within a harborage that is subject to tidal activity.

In accordance with another aspect of the present invention, the body of water is contained within a lock. The lock comprises an input of water with a head relative to the lock and an output of water that is below the head.

In accordance with still another aspect of the present invention, the vessel hull has a high displacement-to-perimeter ratio.

In accordance with still another aspect of the present invention, the piston-cylinder arrangement has two ends, one end of which is fixed to the hull and the other end being fixed to the fixed object.

In accordance with still another aspect of the present invention, the piston-cylinder arrangement has two ends that are each respectively pivotally coupled to the hull and the fixed object.

The present invention also provides a method of generating power, wherein a vessel hull that has a displacement is provided. The vessel hull is floated on a varying water level, wherein the vessel hull moves vertically. The displacement of the vessel hull is varied so that the vessel hull has a first displacement on a rising water level and a second displacement on a falling water level, with the second displacement being greater than the first displacement. Power is generated from the vertical movement of the vessel hull.

In accordance with one aspect of the present invention, the step of varying the displacement of the vessel hull further comprises taking on water and discharging water from the vessel hull.

In accordance with still another aspect of the present invention, the step of taking on water and discharging water from the vessel hull further comprises providing a port in the vessel hull that allows water to flow out of the vessel hull. A buoyant cover is provided for the port. The cover is allowed to move between open and closed positions relative to the port, wherein on a rising water level, the cover is in the closed position, and on a falling water level, the cover moves to the open position.

The present invention provides an apparatus for producing power. A floating vessel hull has an interior for containing water. The vessel hull is located on a body of water that has a rising and falling water level. The vessel hull moves vertically between a top position, wherein the vessel hull takes on water into its interior, and a bottom position, wherein the vessel hull discharges water from its interior. A generator converts the vertical movement of the vessel hull into electricity.

In accordance with one aspect of the present invention, the vessel hull has side walls and a base that move vertically along guides. The base opens and closes a first port to the vessel hull interior. The vessel hull has a second port to the interior. The second port communicates with the water body when the vessel hull is at the top position. When the vessel hull is at the bottom position, the base separates from the vessel hull to open the first port. The base is more buoyant than the side wall.

The present invention also provides a system for generating electrical power from water flowing in a channel. A conduit has intake and discharge ends. The intake end communicates with the water in the channel and is located at a first elevation. The discharge end is located at a lower elevation than the first elevation. A turbine is located in the conduit. A generator is operatively connected to the turbine. The conduit allows water to flow in the channel as well as inside the conduit.

In accordance with one aspect of the present invention, the conduit is located outside of the channel.

In accordance with another aspect of the present invention, the conduit is located inside of the channel.

In accordance with still another aspect of the present invention, the conduit is a pipeline.

In accordance with another aspect of the present invention, one of the intake or discharge ends is connected to a harborage, which harborage has a rising and falling water level.

In accordance with still another aspect of the present invention, the harborage comprises a lock that allows vessels to pass therethrough.

In accordance with still another aspect of the present invention, a vessel is located in the harborage. A linear-to-rotary converter is coupled between the vessel and a fixed object. The converter converts the vertical movement of the vessel into rotational movement.

BRIEF DESCRIPTION OF THE DRAWINGS

FIGS. 15–17 show the vessel hull of FIG. 13 in various vertical positions. FIG. 15 shows the vessel hull rising. FIG. 16 shows the vessel hull at maximum vertical elevation with the vessel hull taking on water. FIG. 17 shows the vessel hull at minimum vertical elevation with the water being discharged therefrom.

DESCRIPTION OF THE PREFERRED EMBODIMENT

The present invention provides a way to extract energy from the rise and fall of the tides. A vessel hull is provided in a protective harborage enclosure. Water from the tides is admitted into the harborage so as to raise the vessel hull and released so as to lower the vessel hull. Mechanical converters are attached between the movable hull and a fixed object, such as the harborage itself; the converters convert the vertical movement of the hull into rotational mechanical energy, which is used to power an electrical generator. The electricity can be transmitted over conventional power lines to users.

Figure 1:
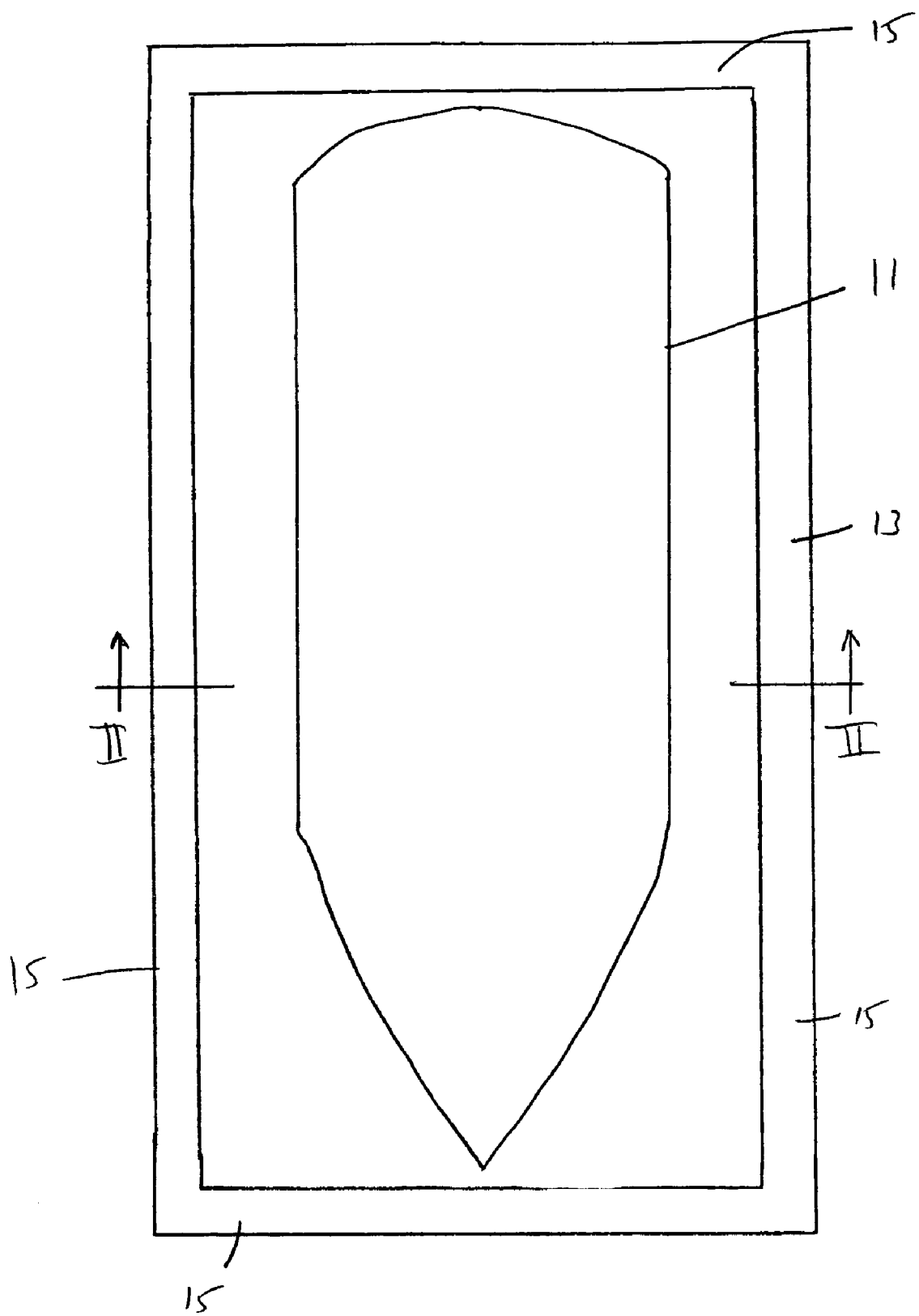
FIG. 1 is a plan view of a hull and harborage enclosure arrangement as used with the present invention, in accordance with a preferred embodiment.
Figure 2:
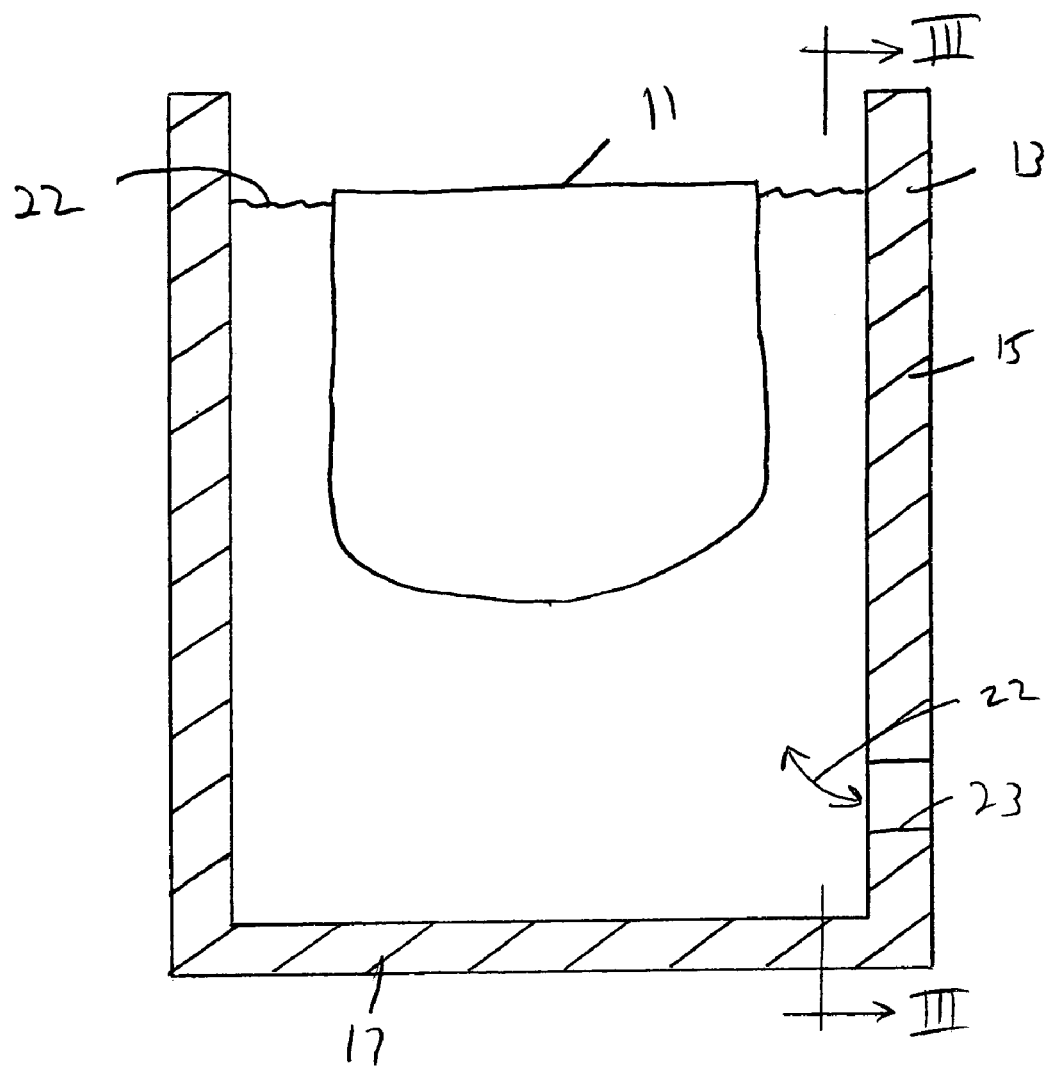
FIG. 2 is a cross-sectional view, taken through lines II—II of FIG. 1.

The vessel hull can be an ocean-going ship, an inland (fresh water) ship, a barge, etc. The vessel hull 11 can be a ship hull (see FIGS. 1 and 2). After a ship has served a useful life, whether commercially or militarily, it is mothballed or scrapped. Using a scrapped ship hull in this invention reduces costs and allows the serviceable life of the hull to be extended.

The hull is stripped of all non-essential equipment such as engines. In addition, the hull is sealed and made water tight. For example, the propeller shaft can be removed and the shaft opening sealed. Components subject to bimetallic degradation are removed. The deck can also be sealed in order to minimize the amount of freeboard. Minimizing the amount of freeboard allows for increased hull displacement, which in turn allows for an increase in power generation.

The vessel hull need not be a used hull, but could be constructed for this particular purpose. For example, because the hull need only move up and down and does not need to move horizontally, the hull can be a large rectangular box without any drag-minimizing shapes or configurations. Such a hull can be designed to maximize buoyancy. The hull can be made of metal, wood, composites (such as fiberglass) or other materials. A deck or a top is provided on the hull in order to keep rain and water from entering the hull. The weight of the hull 11 can be adjusted with ballast and equipment. Most if not all of the electrical generation equipment can be located in the hull 11.

The side walls of the hull 11 can be strengthened if need be. To this end, steel plates can be welded onto the inside or outside of a hull.

The harborage 13 receives the vessel hull 11 and allows the vessel hull to move vertically up and down with varying water levels. In some installations, the harborage protects the vessel hull and the other equipment (such as the linear-to-rotary converters discussed below). In some installations, the harborage serves to regulate the water level and thus the vertical movement of the vessel hull.

Referring to FIGS. 1–4, the harborage 13 surrounds the sides of the hull 11 so as to protect the hull from wind and wave action. This is particularly desirable where the harborage is located in bays or open water and is subject to storms, ice or tsunamis. In most locations, the harborage completely surrounds the hull. However, in some locations, the harborage need not surround the hull but need only be between the rough water and the hull, much like a break water. The harborage 13 has side walls 15. The side walls can be set into the bottom of a water body, such as a bay or channel, or it can be attached to a bottom wall 17 which bears on the bottom of a water body. Underneath the bottom wall 17 is some foundational structure. One of the walls forms a door 19 (see FIG. 4) or doors that can be opened and closed. This allows the hull to be floated through the open doors into the harborage, with the doors closing. Alternatively, the harborage can be left open with one wall missing, until the hull is located therein. After the hull is located inside of the harborage, then the wall can be attached to close off the access opening. A roof 21 or top wall can be provided so as to fully enclose the hull and allow the interior to be sheltered from the weather.

The harborage 13 can be of metal or concrete. For example, the harborage could be a dry dock that is to be mothballed or a caisson that is floated to the desired location and then sunk. The harborage could also be of the cofferdam type which has vertical steel panels inserted into the bottom of a water body.

The harborage 13 is not water tight so as to allow water 22 to flow in and out. One or more ports 23, or openings, are provided in one or more of the side walls 15. The ports 23 are located below the lowest level of water outside of the harborage, such as below the lowest tide.

Figure 4A:
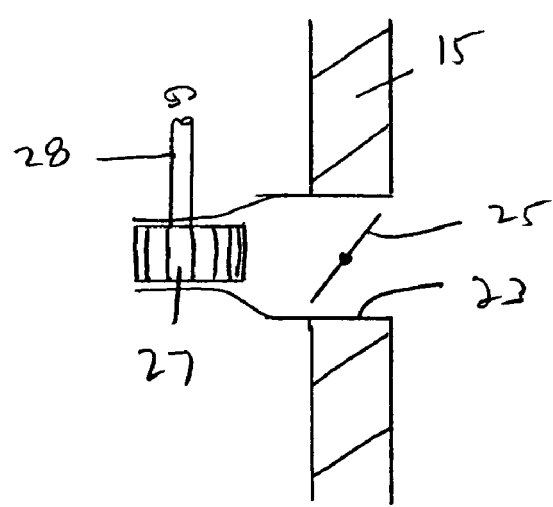
FIG. 4A is a cross-sectional view of a port in the harborage enclosure.
Figure 3:
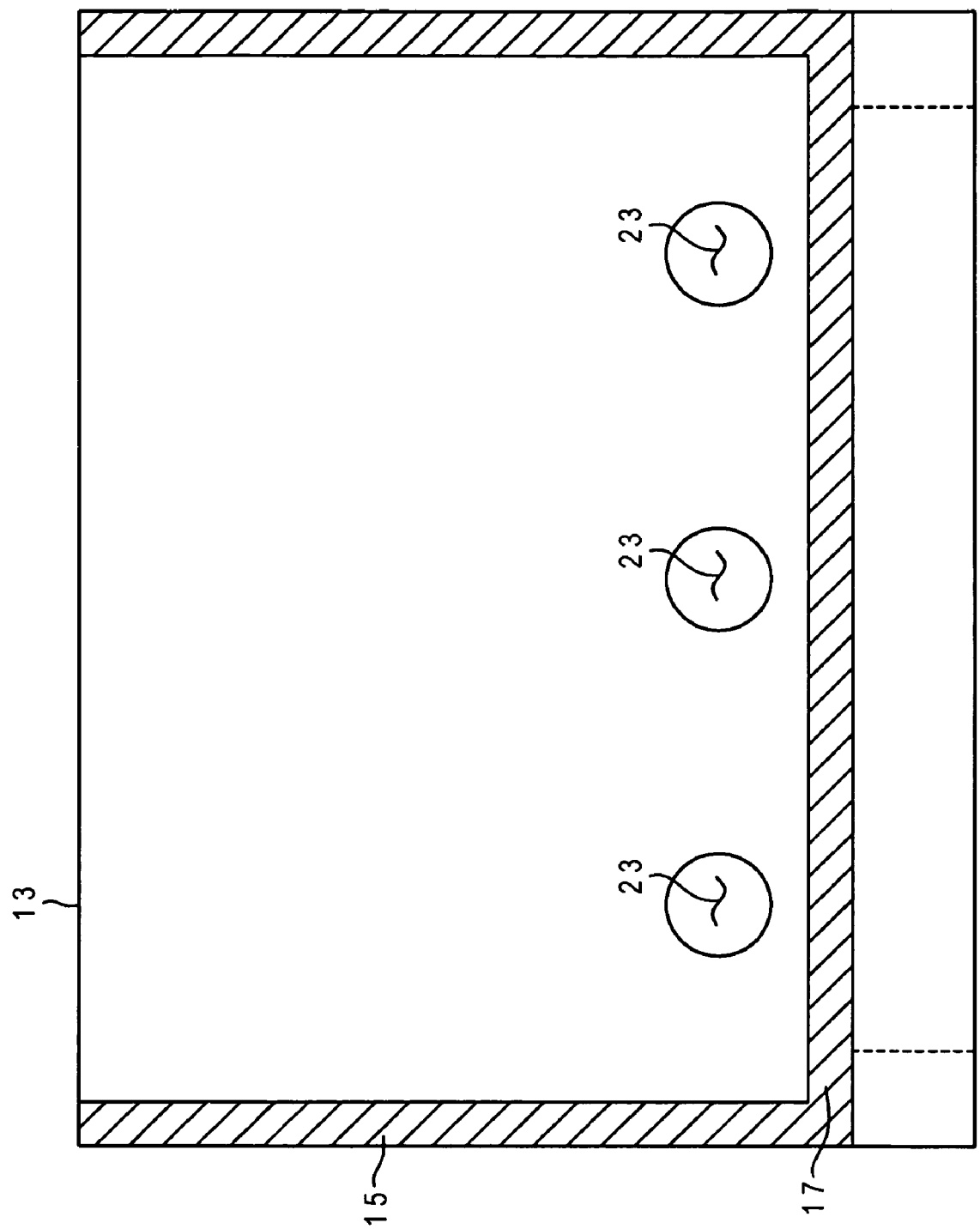
FIG. 3 is a cross-sectional view of a side wall of the harborage enclosure taken through lines III—III of FIG. 2.

In the preferred embodiment, the ports 23 are equipped with valves 25 (see FIG. 4A). When the water level is lowered and the valves 25 are closed, the harborage can be used to maintain or repair the vessel hull, much like a dry dock.

The ports 23 can also be equipped with impellers or turbines 27. The valves 25 are selectively opened and closed to regulate the amount of water flowing through the ports 23. The turbines 27 rotate when water moves through the ports. The turbines are connected to electric generators. The turbines can be directly connected to generators, such as by shafts 28 and gears. Alternatively, the turbines could drive hydraulic motors which in turn drive the electrical generators.

The harborage 13 is located so as to be subjected to different water levels. For example, the harborage could be located in a water body such as a harbor or bay. Preferably, the harborage is located in an area with a large tidal swing, such as off the coasts of New England, or of France, or in the Bay of Fundy, the Bay of Bengal or the Arabian Sea along India. The harborage could also be located in open water, much like a platform for oil and gas wells. The Gulf of Mexico, off the Louisiana coast, is heavily populated with such platforms. Alternatively, the harborage could be set into land, with a water channel that subjects the hull inside of the harborage to tidal activity or variable water levels. Such a harborage would be surrounded by land on three sides with the remaining side having one or more openings to the water. Alternatively, the harborage could access a water body with tidal activity via a channel, such as a river, canal or large ducts.

Figure 4:
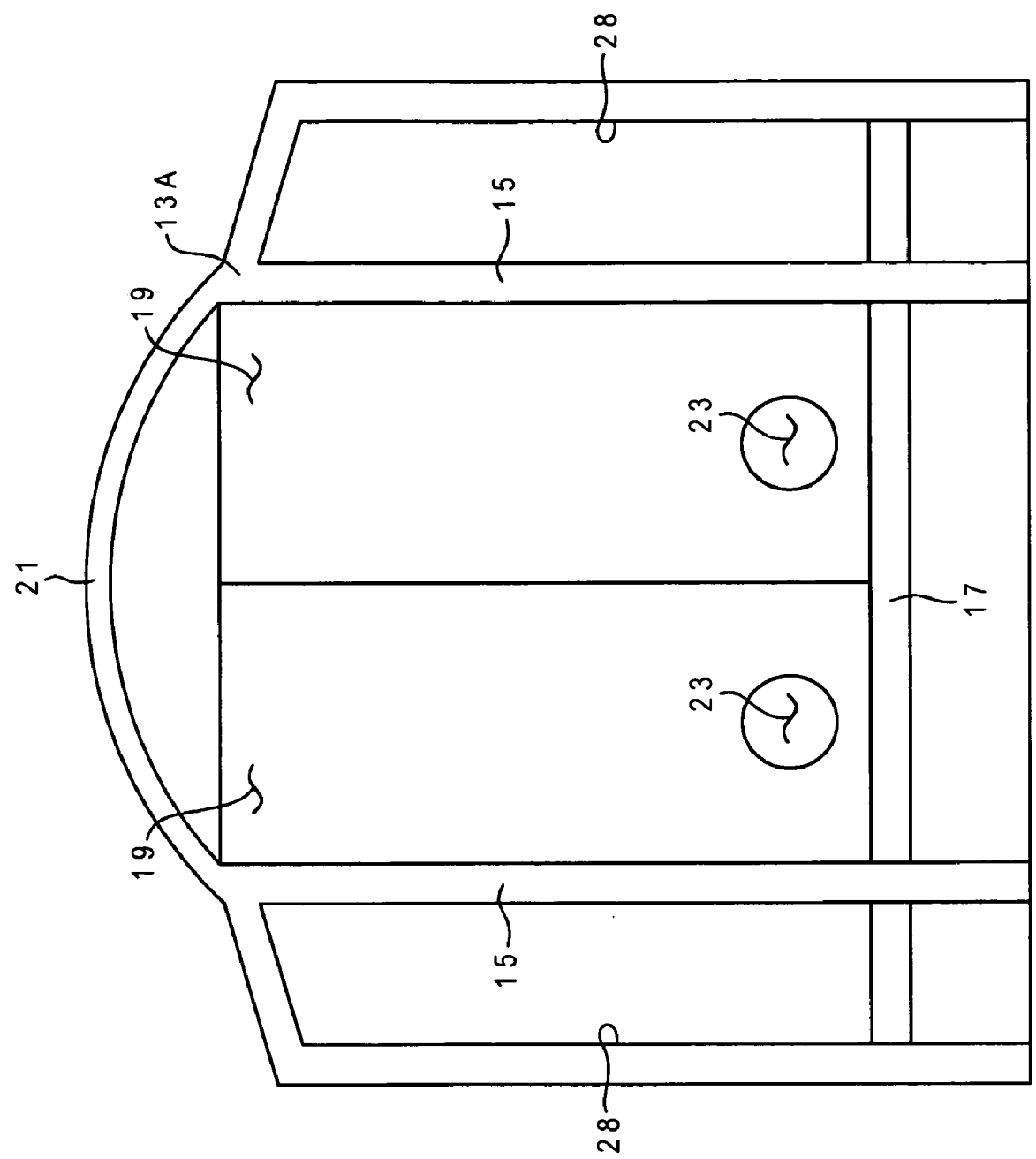
FIG. 4 is an end view of the harborage enclosure, in accordance with another embodiment.

FIG. 4 shows a harborage 13A in accordance with another embodiment. The harborage 13A blocks a passage, such as in a break water, or a barrier. Ducts 28 are covered to protect the water on the sides from freezing in cold weather. Alternatively, the ducts could serve as canals 28 on one or both sides allow water to flow past the harborage. In this embodiment, the harborage can act as a lock.

The harborage 13 is deep enough and large enough so that the hull is always floating, even with low tide or low water levels. If the harborage is not deep enough, and there is no bottom wall, the bottom can be dredged out or excavated to increase the depth beneath the hull. The side walls of the harborage are high enough to offer protection from wind and waves, particularly in stormy weather. To minimize damage, the hull should be shielded from exposure to high wind and waves.

As the tides change, water moves in and out of the harborage. In the preferred embodiment, the water ingresses and egresses the harborage through the ports 23. The doors 19 could be opened and closed to allow water to move in and out of the harborage. When the tide is coming in, water enters the harborage through the ports 23, spins the turbines 27, and lifts the hull 11. When the tide is leaving, the water exits the harborage through the ports, spinning the turbines 27 and allowing the hull to lower. Thus, the hull moves vertically up and down inside of the harborage.

This motion of the hull 11 is captured by linear-to-rotary converters between the hull and a fixed object, such as the harborage, the water body bottom, or in the case of an harborage adjacent to land, then the land itself. The hull movement can be captured by a number of types of devices. One such converter is a hydraulic cylinder and piston. Another type of converter uses levers and gears, while another uses cables and pulleys, while still another uses a rack and pinion gear.

Figure 5:
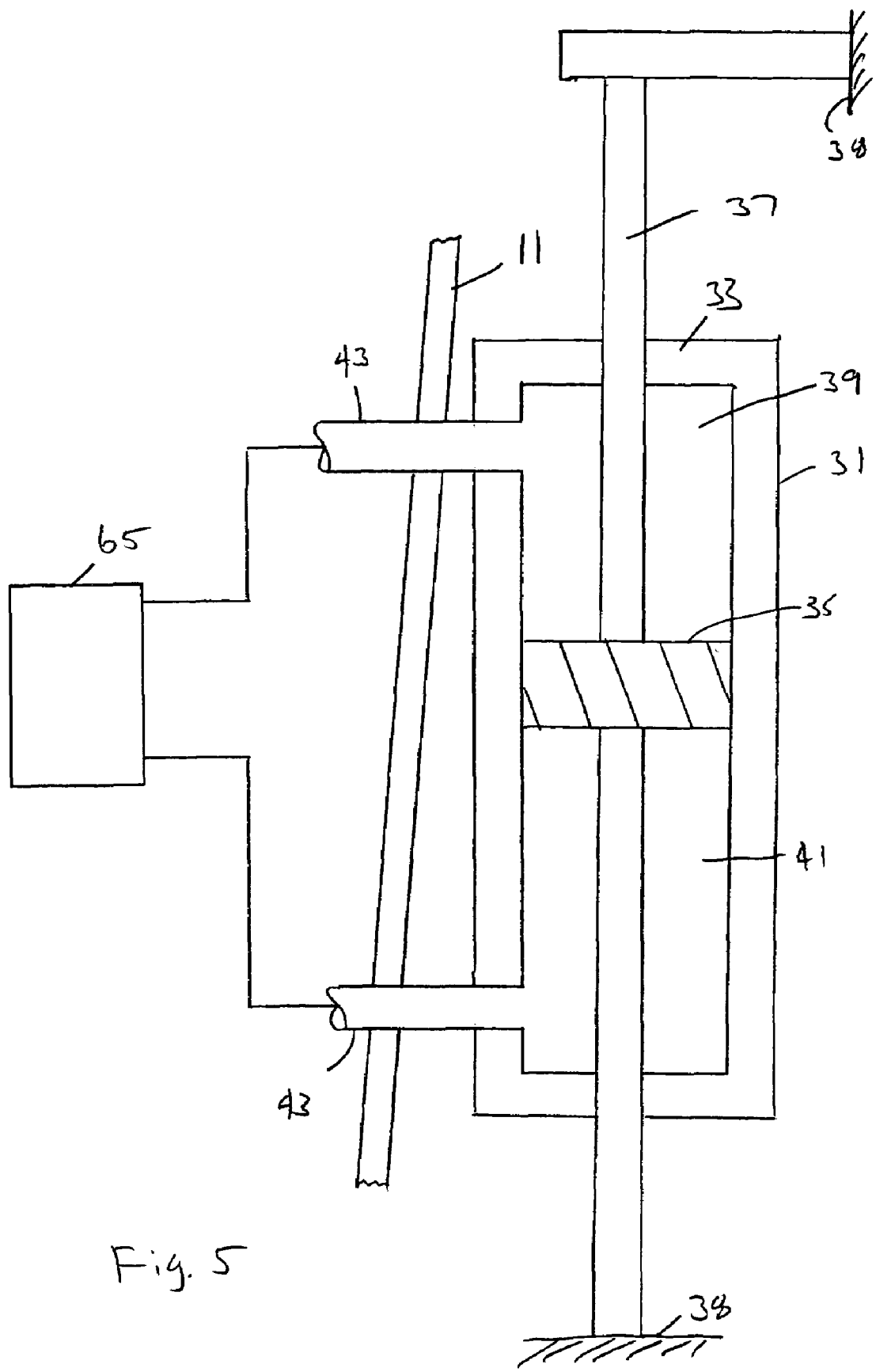
FIG. 5 illustrates one type of linear-to-rotary converter, namely a piston-cylinder arrangement, between the vessel hull and a fixed object.

Referring to FIG. 5, there is shown a double acting piston and cylinder 31. In the preferred embodiment, the cylinder 33 is coupled to the vessel hull 11, while the piston 35, mounted on a rod 37, is coupled to a fixed object 38, such as the harborage 13. Thus, the cylinder 33 moves with the hull 11, while the piston 35 is fixed. The piston 35 divides the cylinder 33 into an upper chamber 39 and a lower chamber 41. Hydraulic lines 43 extend from each chamber through the vessel hull to a turbine 65 located in the vessel or on shore. As the vessel 11 rises, with an incoming tide or rising water level, the cylinder 33 moves up. The piston 35 pressurizes the hydraulic fluid in the lower chamber 41 and provides a partial vacuum to the hydraulic fluid in the upper chamber 39. Conversely, as the vessel falls, with a receding tide, the piston pressurizes the hydraulic fluid in the upper chamber 39 and provides a partial vacuum to the hydraulic fluid in the lower chamber 41. The hydraulic fluid can be a liquid or gas or a combination of both. The hydraulic fluid is preferably water, or even more preferably, a polymer or oil based liquid. A long chain polymer liquid is less likely to leak around the piston.

The piston and cylinder can be made of ceramic. Ceramic is strong and can withstand large forces that are applied to the piston and cylinder. Ceramic can be finely machined to provide for tight tolerances between the piston and the cylinder. With tight tolerances, such as on the order of microns of clearance between the piston and the cylinder, no seal between the piston and the cylinder is required. A hydraulic fluid with long chain polymers will not leak past the cylinder.

As an alternative, the piston 35 could be coupled to the vessel wall and the cylinder 33 fixed stationary.

Figure 6:
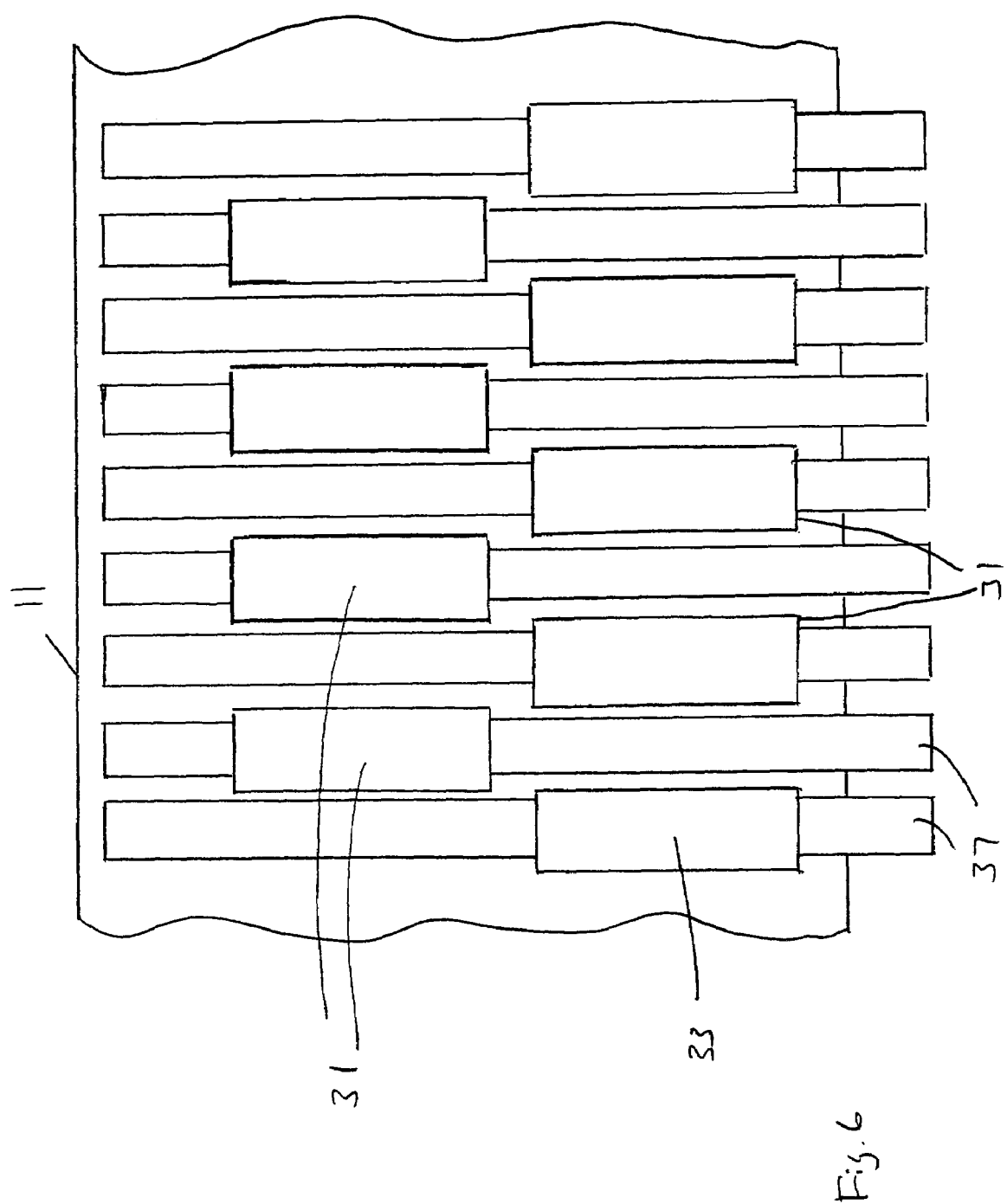
FIG. 6 shows an arrangement of piston-cylinders along a vessel side.

What makes a ship hull 11 particularly suited for reaping power from the tides is the large size of the vessel. The vessel has a large displacement (typically several thousands of tons, up to tens of thousands of tons). Thus, the force available is large, which in turn means that large amounts of electrical power can be generated. As shown in FIG. 6, a number of piston-cylinders 31 can be attached along each side of the vessel hull, with all sides having piston-cylinders. The cylinders 33 can be vertically staggered so as to allow for tighter packing and to increase the number of cylinders along a side of the hull. The piston-cylinders allow the vessel hull to move vertically, but constrain the vessel hull from moving horizontally.

The bottom of the vessel hull can be provided with piston-cylinders. Thus, the piston-cylinders or other linear-to-rotary converters, can be placed along the sides of the vessel hull and the bottom of the vessel hull.

Figure 7:
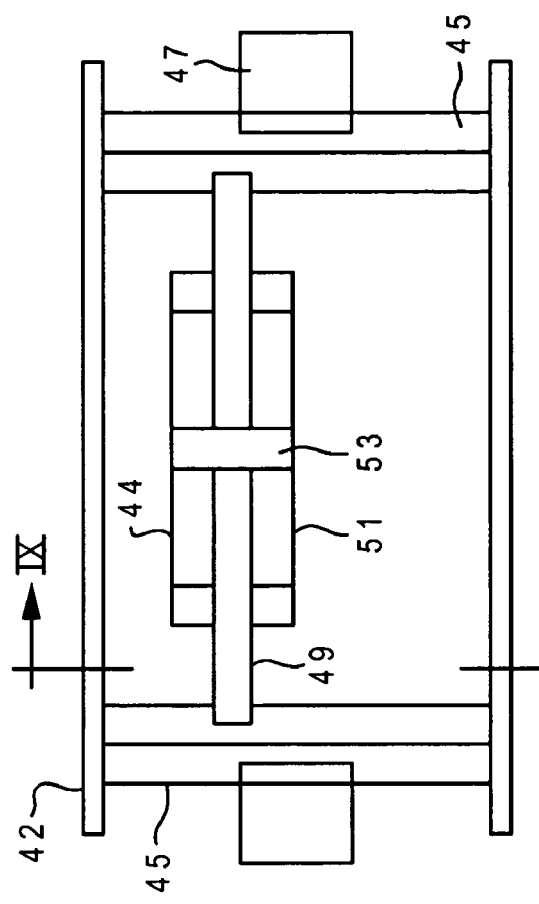
FIG. 7 is a longitudinal cross-sectional view of a master-slave cylinder arrangement, in accordance with another embodiment.
Figure 9:
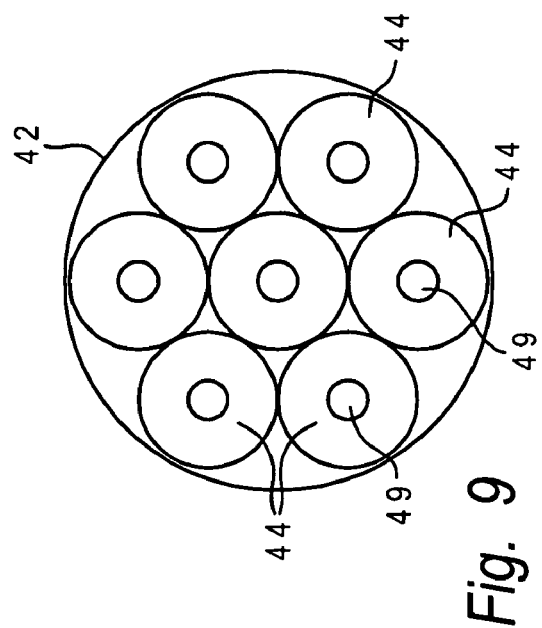
FIG. 9 is a cross-sectional view, taken at lines IX—IX of FIG. 7.
Figure 8:
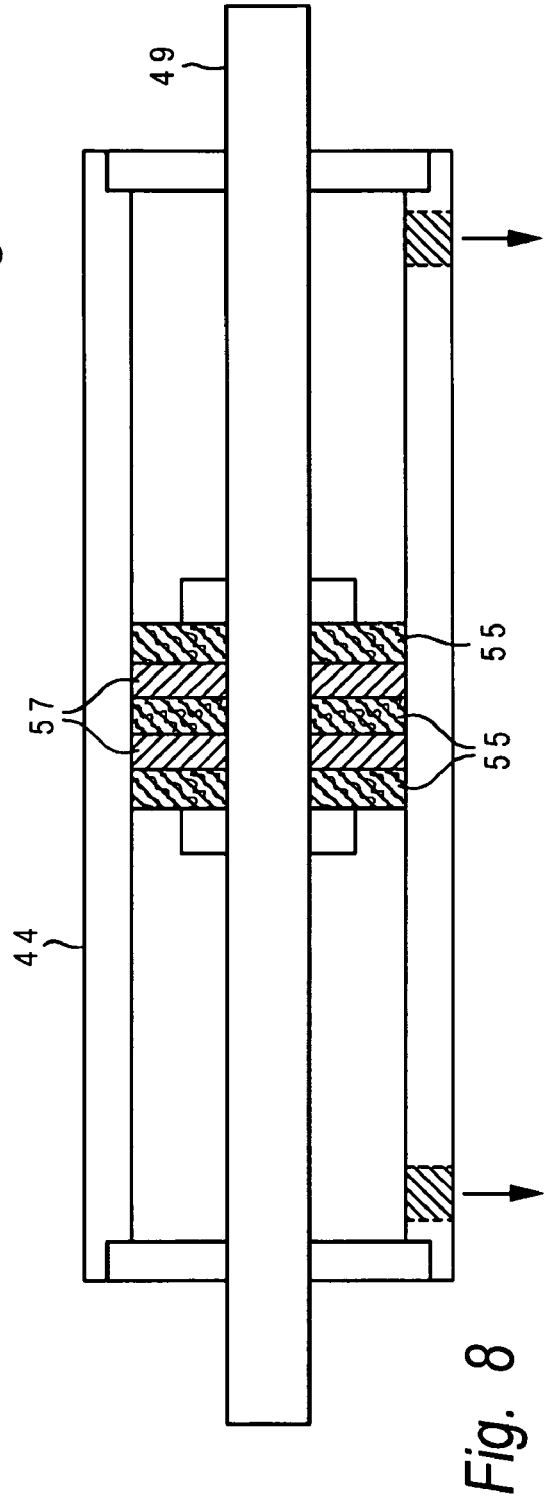
FIG. 8 is a longitudinal cross-sectional view of one of the slave piston-cylinders of FIG. 7.

FIGS. 7–9 illustrate another type of hydraulic cylinder. There is provided a master cylinder 42, or outer cylinder. A number of smaller cylinders, or slave cylinders 44, are provided on the inside of the master cylinder 42. The smaller cylinders 44 are ganged together so as to work in unison.

This master cylinder arrangement is useful where wide temperature ranges are experienced. Such wide temperature variations make cylinders prone to leakage around the pistons, particularly under high pressure.

The master cylinder 42 is equipped with two end plates 45, as shown in FIG. 7. The plates 45 are movable with respect to the master cylinder 42. The master cylinder 42 is configured as is the cylinder 33 shown in FIG. 5, in that the master cylinder moves with the hull 11 and the plates 45 and their rods 47 are fixed. The piston rods 49 of the slave cylinders 44 are attached to the master cylinder plates 45. The cylinders 51 of the slave cylinders 43 are attached to the master cylinder 42. Thus, any movement of the master cylinder also moves the slave cylinders 51 about their fixed slave pistons 53. The master cylinder protects the slave cylinders from the environment and provides some thermal protection.

FIG. 8 shows a slave piston 53. The piston 53 has ceramic or metal plates 55, interweaved with air or graphite plates or elements 57. This arrangement provides a seal, particularly under high pressures. The piston arrangement of FIG. 8 can also be used in a single cylinder and need not be used in a slave cylinder.

The slave cylinders 44 are packed into the master cylinder 42. FIG. 9 illustrates such an arrangement, where there is an outer ring of slave cylinders and a center slave cylinder.

Figure 10:
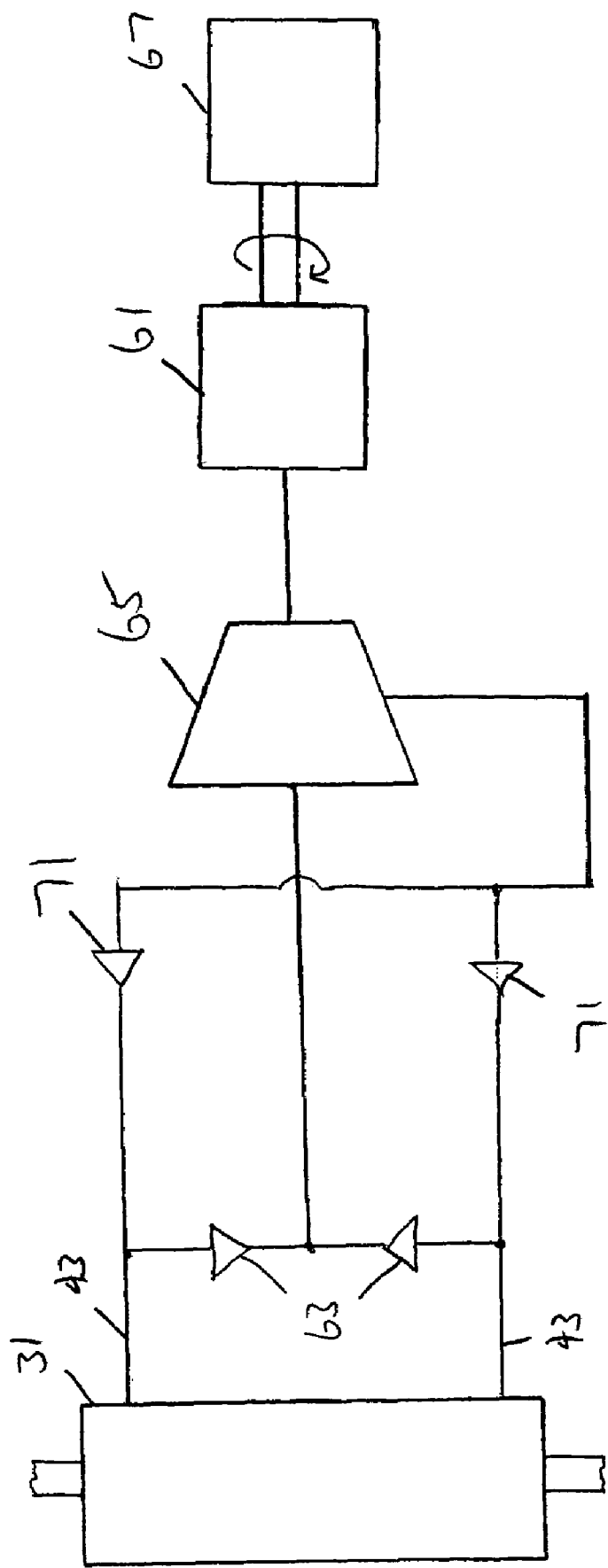
FIG. 10 is a schematic view showing the power generation system of the present invention, in accordance with a preferred embodiment.

FIG. 10 shows how electrical power is generated from a piston-cylinder 31. The pressurized hydraulic fluid is output from each piston-cylinder 31 into a turbine 65, impeller, compressor or gear motor, wherein the pressurized fluid does the work by imparting rotation to the turbine. An impeller is a wheel-like device having vanes or cups on its outer periphery. The pressurized fluid impacts the impeller to rotate the impeller. There is little or no leakage, or slippage, of the pressurized fluid past the vanes or cups in the impeller, thereby providing a high degree of efficiency. This rotation drives a gear box 61, which in turn drives an electric generator 67. One-way, or check, valves 63 are located in each line 43 between the cylinder 31 and the turbine 65. The valves 63 direct the pressurized fluid from the cylinder into the turbine and away from the low pressure side of the cylinder. Fluid exits the turbine 65 and returns to the low pressure side of the cylinder through check valves 71. An accumulator can be optionally used on the high pressure side of the cylinder. A low pressure accumulator can be optionally used on the low pressure side of the cylinder. Also, the lines 43 from several piston-cylinders 31 can be connected together to drive a single turbine. Because the cylinders are double acting, pressurized fluid is produced on both the rising and the ebbing tides.

The tides have slack periods, namely at high tide and at low tide. These slack periods are when the flow of water in a water body changes direction. During slack tides, no pressurized fluid is produced by the vessel. Also, the tides are not constant. Neap tides are lower than normal, while spring tides are higher than normal. Neap and spring tides occur over numerous cycles.

Because it is uneconomical to store large amounts of electricity in batteries, electricity must be produced as it is used. One way to smooth out the fluctuations in the tides and produce electricity constantly, or nearly so, is to regulate the water flowing through the ports 23 (see FIG. 4A) of the harborage 13. The ports are equipped with valves 25 that regulate the size of the openings. The ports are sized small enough, with the valves, to slow the filling of the harborage or release of water therefrom. For example, if high tide occurs at 6:00 am, with slack tide between 5:00 to 7:00 am, then the ports are sized so that the water continues to flow into the harborage until 7:00 am. The ports are sized by knowing the water capacity of the harborage and the height of the tides. At 7:00 am, the tide starts to recede and water begins to exit the harborage. A slack or low tide is between 5:00 pm and 7:00 pm, so water exits the harborage until 7:00 pm. In other words, the ports are sized to slow the flow of water in and out of the harborage. This allows the vessel hull 11 to almost always be moving either up or down. The short periods of time when the vessel changes direction can be compensated for by the high pressure accumulator 61. Because the height and speed of the tides vary, the valves 25 can be adjusted on a frequent basis.

Still another way to smooth out the tidal variations and slack tides is to retard the vertical movement of the vessel hull. For example, on a rising tide, the piston-cylinders can retard the rise of the hull. This can be accomplished by putting an orifice on the output lines 43 of the piston-cylinder, which orifice limits the amount of fluid exiting from the cylinder. Thus, as the vessel hull is being buoyed up by the rising water in the harborage, the piston-cylinders extend at a slower rate due to the resistance of the orifices, and effectively slows the ascent of the vessel hull. Conversely, as the water level in the harborage drops, such as due to an ebbing tide, descent of the vessel hull is slowed by contracting of the piston-cylinders, which contraction is slowed by orifices in the hydraulic lines. Regulating the fluid output of the piston-cylinders allows for smoother operation of the electrical generation equipment. The orifices can be fixed or variable.

Retarding, or resisting, the vertical movement of the vessel hull also alters the displacement of the vessel hull. For example, on a rising tide, the vessel hull displacement increases as the water line on the vessel hull moves up. On a receding tide, the vessel hull displacement decreases, as the water line on the vessel hull drops down. In both cases, potential energy is accumulated. This potential energy can be captured by opening the orifices and allowing the vessel hull to move to its normal displacement.

Regulating the flow of water in and out of the harborage or retarding vertical movement of the hull serve to desynchronize the vertical movement of the vessel hull from the tidal variations. Specifically, the vertical movement of the vessel hull lags the tidal variations. This allows energy to be stored and used during slack tides.

Figure 11:
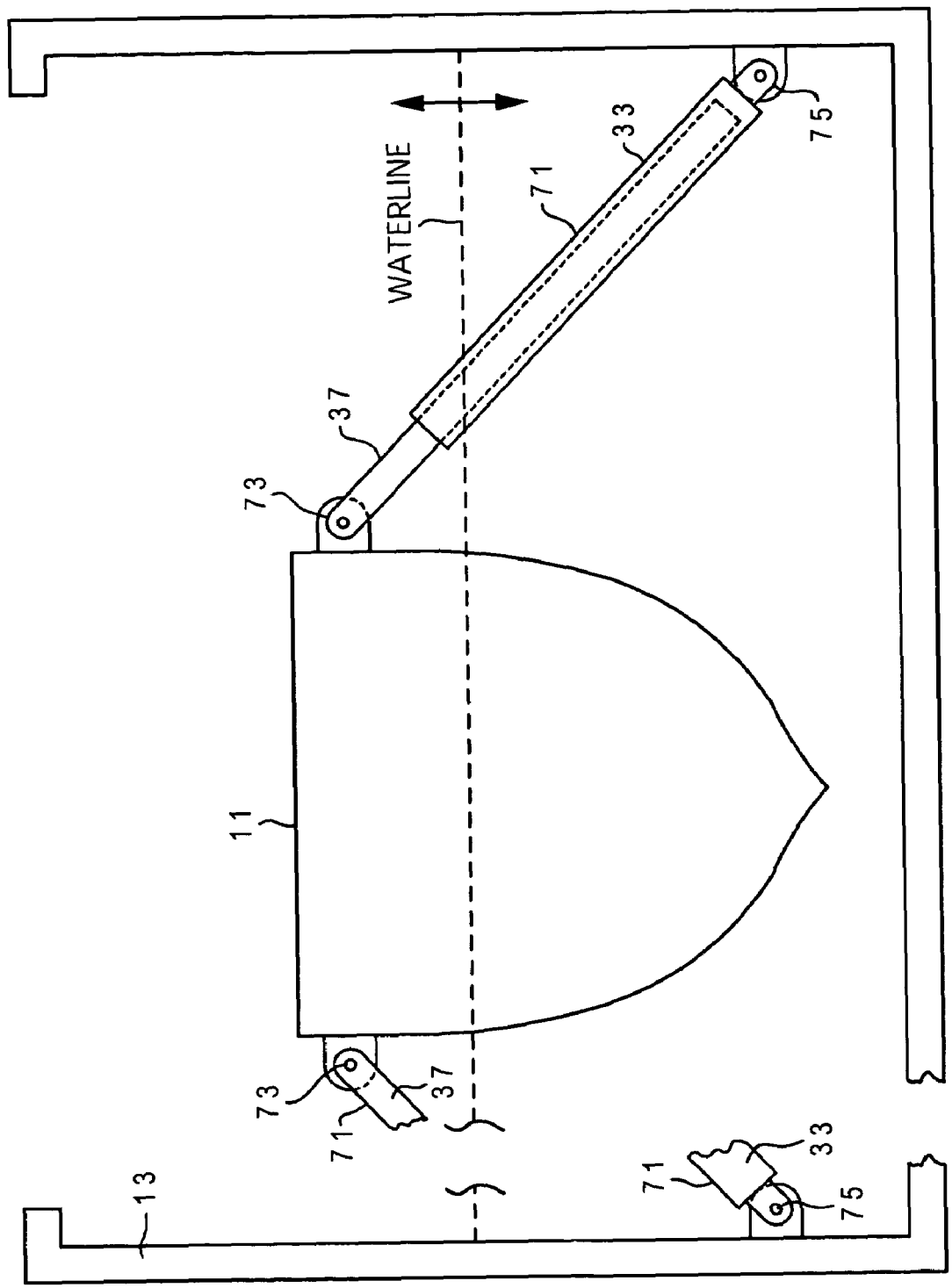
FIG. 11 shows a linear-to-rotary converter between the vessel and the harborage, in accordance with another embodiment.

FIG. 11 shows another converter, in accordance with another embodiment. The converter 71 is a hydraulic cylinder having two ends 73, 75. One end 73 is pivotally coupled to the vessel hull 11, while the other end 75 is pivotally coupled to a fixed object. The cylinder 71 has a piston contained therein. The piston can be a double acting piston or a single acting piston. All sides of the vessel wall will have the converters 71.

As the vessel rises and falls, the orientation of the cylinder changes. This causes the overall length between the two ends 73, 75 to change, thereby moving the piston within the cylinder and producing pressurized fluid. The hydraulic cylinders 71 minimize horizontal movement of the vessel hull so as to keep the hull centered or otherwise properly positioned in the desired location. The hydraulic cylinders 71 act as shock absorbers and reduce the stress on the hull. The hydraulic cylinder 71-vessel hull arrangement of FIG. 11 can be used without a harborage.

Figure 12:
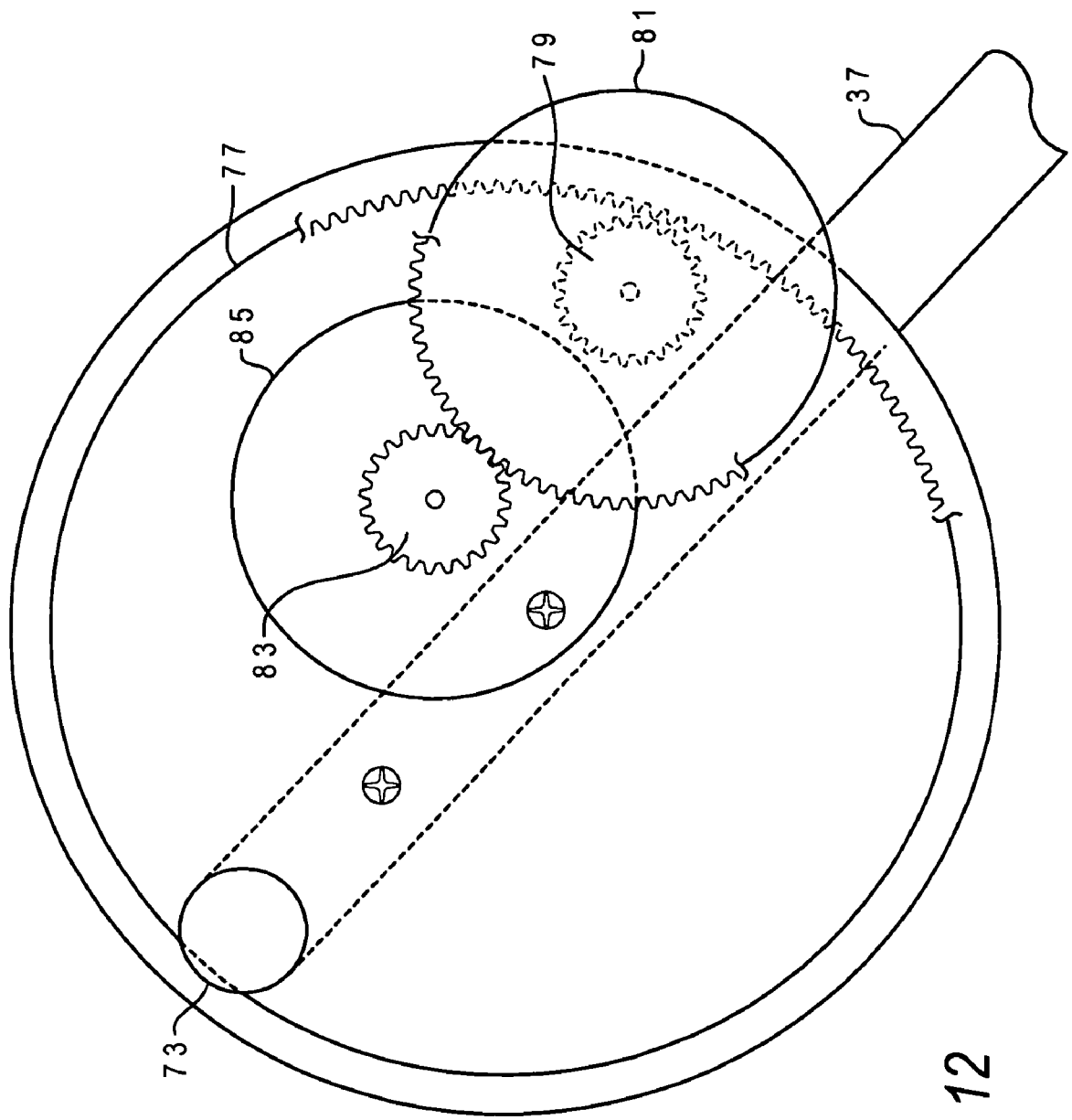
FIG. 12 is a detailed view of a gear arrangement used with the converter of FIG. 11.

The rotary movement of the piston-cylinder at the ends 73, 75 can be tapped for electrical generation. A set of gears is located at each end to amplify or increase the rotational speed. FIG. 12 illustrates one such gear amplifier. A primary gear 77 is fixed to the cylinder or arm at the respective end. The primary gear 77 and a secondary gear 79 form a planetary gear arrangement. Other gears 81, 83, 85 are used if needed to obtain the speed necessary to drive an electrical generator.

The present invention can also be used in non-tidal situations. The rise and fall of the tides can be emulated by a lock in a river or other downhill flowing water body. In a lock, a vessel hull is raised by filling the lock with water from upstream. The vessel hull is lowered by draining the water from the lock on the downstream side.

FIG. 4 illustrates a harborage that can be used as a lock. FIG. 4 shows an end view, such as from the downstream end. The main body of the lock receives the vessel hull. Doors on hinges are shown on the downstream end. Both ends, the downstream end and the upstream end, have ports (or ducts or channels) for the ingress and egress of water to and from the harborage or lock. The ports have valves so as to control the flow of water through the ports.

In operation, the upstream ports are opened to allow water to flow into the lock. The vessel hull rises. Linear-to-rotary converters, such as the piston-cylinder arrangements described above, convert the upward movement of hull to rotary movement. Once the hull is at its maximum vertical height, the upstream ports are closed and the downstream ports are opened to release water from the lock. The vessel hull drops in elevation and the linear-to-rotary converters convert the downward movement of the hull to rotary movement. In lieu of ports in the doors, the upstream doors can be opened to admit water to the lock, while the downstream doors can be opened to release water from the lock.

The linear-to-rotary converters described herein limit the horizontal movement of the vessel hull. Thus, for example, in the lock arrangement, the doors can be opened and the vessel remains inside, merely rising or falling in a vertical manner. The vessel thus stays in the lock.

Because the vessel hull need not move horizontally, the vessel hull can be designed so as to maximize the displacement-to-perimeter ratio. For example, with an ocean going ship, the hull is tapered, especially at the bow and stern sections. The vessel hull in a lock or harborage can be box-like in order to maximize its displacement. The perimeter of the hull, where the linear-to-rotary converters connect to, can be small relative to this displacement. By so maximizing the displacement-to-perimeter ratio, the vertical rise and fall of the vessel hull can be fully taken advantage of.

An advantage of the lock arrangement is that the frequency of vertical hull movement is independent of the tides. In some locations, a tidal cycle of a high tide and a low tide may span 24 hours. This allows only a single rise and a single fall of the vessel hull. With a lock positioned by a water body with some head relative to sea level, such as at a dam or in a river, the number of rises and falls of the vessel hull can be increased over a 24 hour period, thereby generating far more energy.

The lock of FIG. 4 shows two lateral canals. These are optional and allow water to flow on one or both sides of the lock.

The harborage can be used as a lock or as an ancillary device to a lock. In a lock, a vessel is transported between an upper water level and a lower water level. As an ancillary device to a lock, the water from the lock is discharged into the harborage. The vessel hull in the harborage is raised by the water discharged from the lock. To lower the vessel hull, water is discharged from the harborage. Thus, vessel transport can be accommodated by the lock, while power can be generated by the water used in the lock. The harborage can be at the same elevation as the lock, wherein, the water level in the harborage can only rise to part of the elevation of the upper water level. When the two water levels in the lock and harborage are equal, the remaining water in the lock is discharged downstream and not into the harborage. Alternatively, the harborage may be set at a lower elevation than the lock so as to achieve a higher vertical movement of the vessel hull.

The harborage can also be used independently of a lock. For example, a river has a drop in elevation over some distance. Water from upstream, the upper water level, can be conveyed by a channel or conduit independent of the river channel to the harborage, and water can be discharged from the harborage to a lower water level in the river by conduit or channel.

Figure 13:
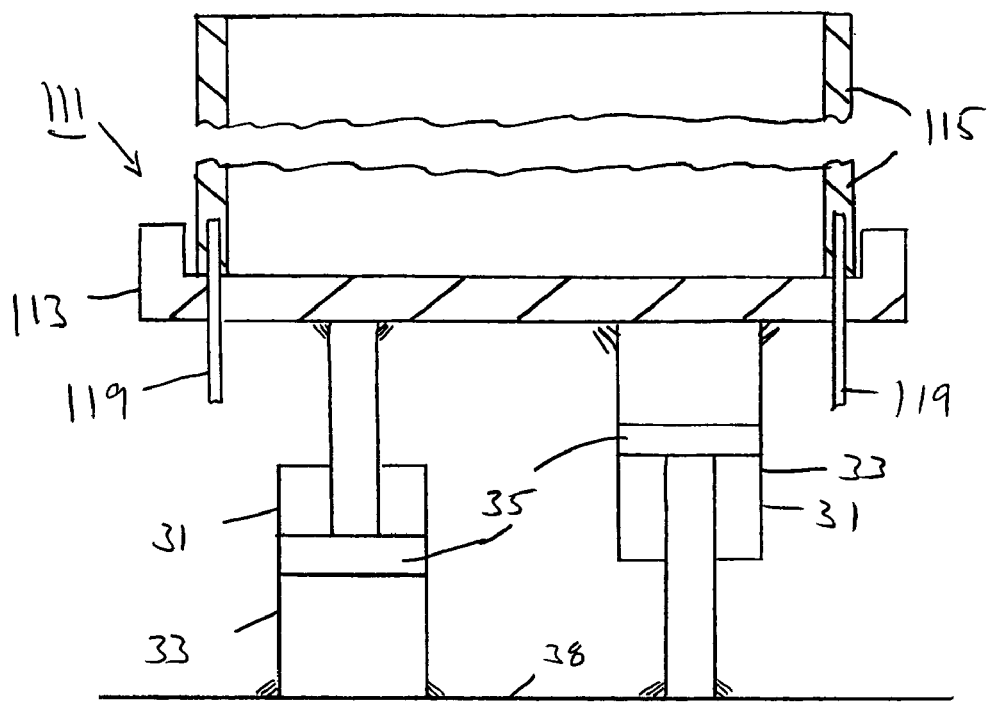
FIG. 13 is a view of the vessel hull, in accordance with another embodiment.

FIGS. 13–17 show the vessel hull 111 in accordance with another embodiment. The linear-to-rotary converters can be coupled to the bottom of the vessel hull, as shown in FIG. 13. The converters are shown as piston-cylinder arrangements 31. The cylinders 33 can be coupled either to earth 38 (shown on the left side of FIG. 13) or to the vessel hull (shown on the right side of FIG. 13), while the pistons are coupled to the opposite member of the cylinder.

The vessel hull 111 is unique in that its displacement changes, depending upon its vertical position. On a rising water level, the displacement of the vessel hull is lower than when the water level is dropping. Because the displacement changes, more energy can be extracted from the vertical movement. On a rising water level, the lower displacement exerts a greater pull on the piston-cylinder arrangements 31. This results in higher pressures developed by the piston-cylinder arrangements 31. On a falling water level, the heavier displacement exerts a greater push on the piston-cylinder arrangements, once again providing higher pressures therefrom. The vessel hull 111 need not have a harborage and can be used in salt or fresh water environments (such as a lock).

The vessel hull 111 has a base 113 and side walls 115. The base 113 and side walls 115 form a container that can hold water. The container is interior of the vessel hull. The top of the vessel hull can be either open or closed with a deck. If closed, a vent to the interior is provided to allow the taking on and discharge of water to and from the interior. The bottom of the side walls 115 is open, unless closed by the base 113. A seal 117 is provided between the side walls and the base to form a water-tight container. The base 113 floats and has positive buoyancy, while the side walls 115 have neutral buoyancy, or even negative buoyancy.

Figure 14:
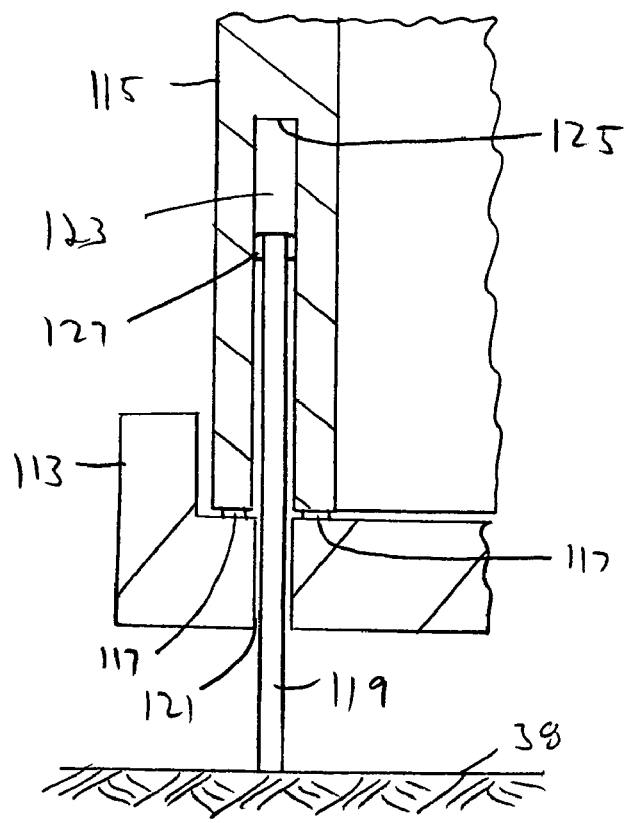
FIG. 14 is a detail view showing a vertical guide for the vessel hull of FIG. 13.

As shown in FIG. 14, the vertical movement of the vessel hull is along guides 119 or posts. The posts 119 are securely anchored to the earth 38. The base 113 has openings 121 therethrough for receiving the posts 119. The base can move vertically along the posts. Seals or bushings (not shown) are provided in the base openings to limit the leakage of water therethrough. The side walls 115 have cavities 123 therein, which cavities are open at the bottom of the side walls and receive the upper ends of the posts 119. The thickness of the side walls at the cavities can be increased in order to accommodate the cavities. Each cavity 123 has a top end 125 which acts as a stop to the lower movement in the side walls. The base has no such limitation on its lowermost movement. The upper end of each post has a stop 127 for limiting upper movement of the base and the side walls. The stop for limiting the upper movement can be on the exterior of the vessel hull, such as a wall that contacts the upper side of the side walls. Likewise, the stop for limiting the lower movement of the side walls can also be exterior of the vessel hull.

The operation of the vessel hull 111 will now be described with reference to FIGS. 15–17. FIG. 15 depicts the vessel hull 111 on a rising water level 131. The base 113 and side walls 115 are together and form a water-tight vessel hull. The vessel hull is empty of water and thereby floats high on the water, following the water up in vertical elevation, guided by the posts 119. The piston-cylinder arrangements 31 create pressurized fluid from this vertical movement.

The upward movement of the vessel hull is limited by stops 127 (see FIG. 14) on the posts 119. The stops engage the base (or optionally the side walls) and prevent the vessel hull from floating up beyond a top position. Because the side walls are not positively buoyant, the side walls stay engaged on the base as the water rises.

The upper limit of the vessel hull is designed so that the water level can continue to rise along the side walls 115 of the vessel hull. As shown in FIG. 16, when the water rises high enough, the water enters the vessel hull either over the top rim or through ports. The ports can be set below the top rim of the vessel hull to prevent complete filling of the vessel hull and maintains some positive buoyancy. The addition of water to the vessel hull increases the mass and thus the displacement of the vessel hull.

When the water level falls outside of the vessel hull, the vessel hull drops in elevation, along the posts 119 and the piston-cylinder arrangements 31 create pressurized fluid. The top ends of the posts then contact the stop surfaces 125 (see FIG. 14) in the side walls to limit the downward movement of the side walls. The base has no such limitation and continues its downward motion. Thus, the base separates from the side walls, breaking the seal so as to form a port or opening and allowing the water inside the vessel hull to discharge, as shown in FIG. 17. The water level outside the side walls will drop to a position where the base breaks free of the side walls.

On the next rising water level, the base rejoins with the side walls, being pushed up by the water level to engage the side walls and form a water-tight vessel hull once again. The base 113 is preferably provided with a lip around the outer periphery thereof.

The vessel hull can also be provided with ports in the nature of those shown in FIG. 4A. That is to say, that the vessel hull can be provided with ports equipped with turbines so that as water flows in and out of the vessel hull, this flow can be used to generate rotational movement and in turn used to generate electrical power.

Figure 18:
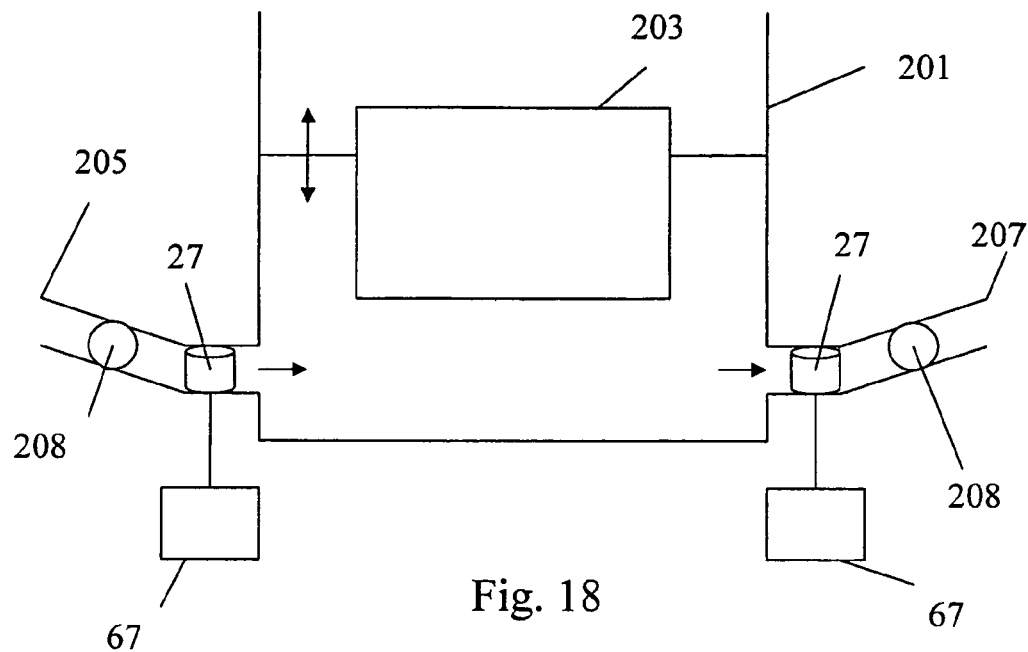
FIG. 18 shows a lock or harborage, in accordance with another embodiment.
Figure 19:
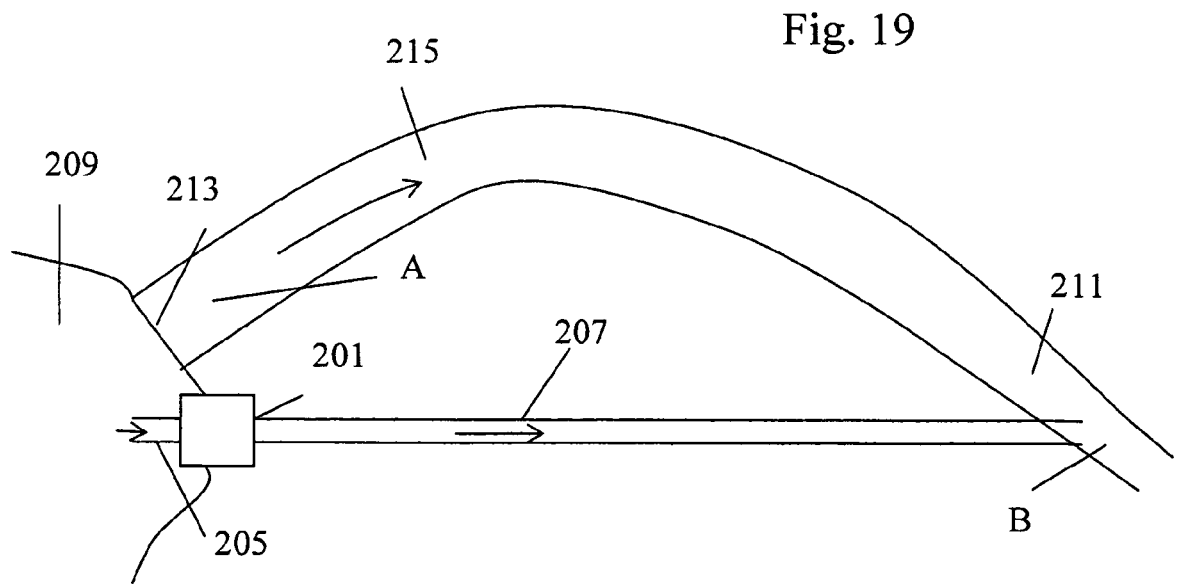
FIG. 19 shows the lock or harborage of FIG. 18 installed in a river environment, in accordance with one embodiment.

FIGS. 18 and 19 show a lock or harborage 201 used in conjunction with a river environment. The lock or harborage 201 has a vessel 203 therein. When used as a harborage, the vessel 203 remains inside as the level of water rises and falls. The vessel is connected to linear-to-rotary converters as discussed above. When used as a lock, the vessel 203 passes through, using the lock to raise or lower to a desired elevation. The vessel in lock is typically not connected to linear-to-rotary converters. Whether used as a harborage or lock 201, power is generated from water flowing into and out of the harborage or lock (hereinafter referred to as a "harborage").

The harborage 201 has an inlet conduit 205 and an outlet conduit 207. The inlet or outlet conduits 205, 207 are provided with valves 208. The inlet conduit 205 extends to a first body of water 209, while the outlet conduit 207 extends to a second body of water 211. The elevation of the first body of water 209 is higher than the elevation in the second body of water 211, thus creating a pressure differential or head. A turbine 27 is located in either the inlet conduit 205, the outlet conduit 207 or both. The turbine 27 is connected to an electrical generator 67 as described above. The turbine 27 rotates and generates electrical power when the water flows through the respective conduit. If the harborage 201 is filling, water flows into the harborage via the inlet conduit 205. The flowing water rotates the turbine 27 in the inlet conduit. The turbine in turn drives an electrical generator 67 to produce electrical power. The outlet conduit 207 is closed during filling of the harborage. The water level in the harborage 201 rises, as does the vessel. If the water level in the harborage 201 is lowered, water flows through the outlet conduit 207, rotating the turbine therein. The inlet conduit 205 is closed during emptying of the harborage. The water level inside of the harborage falls, thereby lowering the vessel 203. If the vessel 203 is coupled to a linear-to-rotary converter, then electrical power can be produced from filling and emptying the harborage and raising and lowering the vessel 203.

The head across the turbine 27 and thus the amount of energy that can be extracted can be increased by extending one or more conduits 205, 207 to a body of water with a more extreme head. Referring to FIG. 19 for example, the harborage 201 is located near a dam 213. The inlet conduit 205 thus draws water from the lake 209 impounded by the dam. Suppose that the level of lake 209 is 458 feet above sea level. The outlet conduit 207 can drain to the water below the dam. Suppose that the water level immediately below the dam (point A) is 412 feet above sea level. The water level 6.7 miles downstream from the dam is 405 feet. If the outlet conduit 207 discharges immediately below the dam, the head would be 46 feet. If the outlet conduit discharges several miles downstream from the dam, at point B in FIG. 19, the head would be 53 feet. Thus, the head is increased by extending the outlet conduit 207 further downstream. Likewise, the harborage can be located at a lower elevation, such as at point B, downstream from the dam, while the inlet conduit 205 is located at the impounded lake 209.

The harborage 201 and conduits 205, 207 can be used without a dam.

FIG. 19 illustrates that the conduits 205, 207 can be located outside of the stream or river bed 215. The conduit can cut across a bend in the river. This shortens the amount of conduit needed. For example, if the river 215 is 6.7 miles from point A to point B, which river bed has a curve or bend, the conduit, without curves, is only 3.88 miles from point A to point B.

Figure 20:
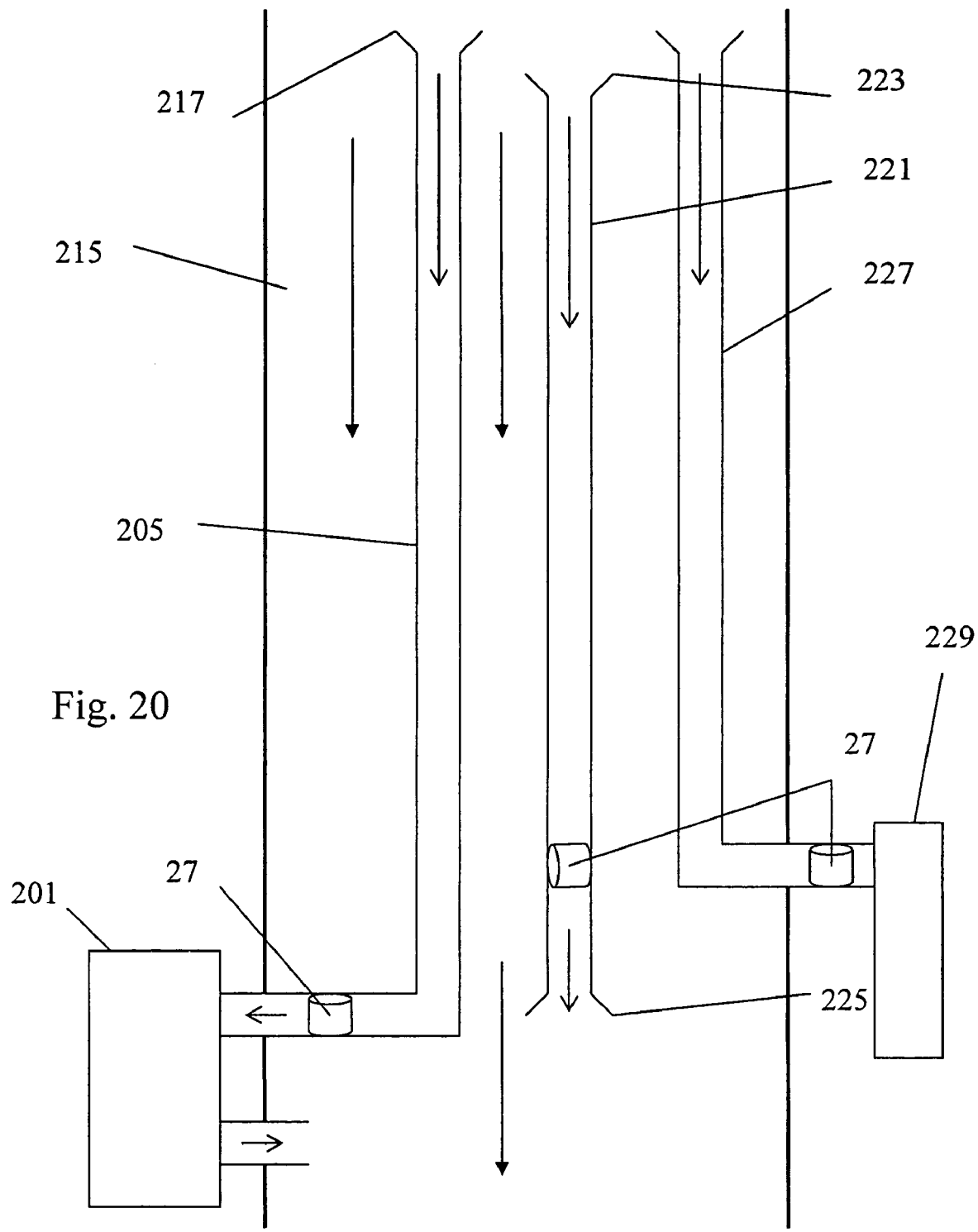
FIG. 20 is another embodiment that shows conduits in the bed of the river, which conduits have power generating turbines therein.

FIG. 20 illustrates the conduit 205 located within the river bed 215. This is particularly useful where the river is straight, but can also be used on a river with bends and curves. In FIG. 20, the harborage 201 is located downstream. The conduit 205 has a turbine 27 therein, located near the harborage 201. The conduit can be submerged so as to be out of sight and so as not to interfere with navigation. The upper end of the conduit has a collector 217 so that some water flowing downstream will enter the conduit. The upper end, or intake end, can be elevated from the river bottom in order to minimize the amount of silt collected by the conduit.

FIG. 20 also illustrates the use of conduits and turbines without harborages. A conduit 221 has an upper end 223 at a first elevation and a lower end 225 at a second elevation, which is lower than the first elevation. The upper end 223 collects water, which water flows through the conduit due to the drop in elevation. The flowing water turns the turbine 27, which turbine then generates electrical power by way of a generator. The water is discharged back into the river. Thus, the conduit 221 is similar to the conduit 205, except as to where the water is discharged. The conduit 205 discharges into a harborage, while the conduit 221 discharges into the river.

The lower end 225 of the conduit 221 has a venturi. The venturi, or expander, causes a pressure drop after the turbine 27. The venturi is useful for increasing the pressure differential or head across the turbine. The venturi is particularly useful in increasing head in a river or stream bed that is relatively flat or has a low head. The venturi need not be located at the lower end of the conduit, but can be located upstream or above the lower end.

Another conduit 227 is similar to conduit 221 but discharges into a water utilization system 229, such as a water treatment plant. Conduit 227 is especially useful for bringing water from a pure source downstream to where the river is polluted.

The conduits 205, 207, 221, 227 of the present invention do not interfere with the flow of water in a river bed or channel. This is a distinct advantage over building a dam, which necessarily interferes with the flow of water by virtue of the fact that the water is impounded by the dam. Furthermore, the building of a conduit or pipeline is less expensive than the building of a dam. A conduit or pipeline can create the same head or pressure as the dam but without the capital expense. In addition, because water is not impounded, thereby altering the riverbank, the conduit of the present invention will not affect wildlife or populations located along the banks of the river as does the dam. Furthermore, because the water flow is not impeded by the conduit, as it is with the dam, there is no silting problem. With dams, as water enters the reservoir impacted by the dam, the water typically contains a load of silt which is deposited on the bottom of the reservoir. Over a period of years, this silt builds up and diminishes the capacity of the reservoir.

The foregoing disclosure and showings made in the drawings are merely illustrative of the principles of this invention and are not to be interpreted in a limiting sense.

The invention claimed is:

1. A system for generating electrical power from water in a channel, comprising:
 a) a conduit having intake and discharge ends, the intake end communicating with water in the channel and located at a first elevation, the discharge end located at a lower elevation than the first elevation;
 b) a turbine located in the conduit;
 c) a generator operatively connected to the turbine;
 d) a harborage connected in line with the conduit, which conduit conveys water into and out of the harborage, which harborage has a rising and falling water level, the harborage having side walls so as to isolate the water level inside of the harborage from the water level in the channel
 e) a vessel located in the harborage, the vessel moving vertically between a top position, wherein the vessel takes on water into its interior, and a bottom position, wherein the vessel discharges water from its interior;
 f) a generator that converts the vertical movement of the vessel into electricity.

2. The system of claim 1 wherein the conduit is located outside of the channel.

3. The system of claim 1 wherein the conduit is located inside of the channel.

4. The system of claim 1 wherein the conduit is a pipeline.

5. The system of claim 1 wherein the conduit comprises a first conduit portion extending from the intake end to the harborage and a second conduit portion extending from the harborage to the discharge end.

6. The system of claim 1 wherein the harborage comprises a lock that allows vessels to pass therethrough.

7. The system of claim 1, comprising said vessel located in the harborage and a linear-to-rotary converter, at least part of which is coupled between the vessel and a fixed object, the converter converting the vertical movement of the vessel into rotational movement.

8. The system of claim 1, wherein:
a) the vessel has a side wall and a base that move vertically along guides, the base opening and closing a first port to the vessel interior;
b) the vessel having a second port to the interior, the second port communicating with the water inside of the harborage when the vessel is at the top position;
c) when the vessel is at the bottom position, the base separates from the vessel to open the first port, the base being more buoyant than the vessel side wall.

* * * * *